United States Patent

[11] 3,610,843

[72] Inventor Trifon P. Tripsas
Elmhurst, Ill.
[21] Appl. No. 33,027
[22] Filed Apr. 29, 1970
[45] Patented Oct. 5, 1971
[73] Assignee GTE Automatic Electric Laboratories Incorporated
North Lake, Ill.

[54] COMMUNICATIONS SYSTEM, DOUBLE CONNECTION TRAP CIRCUIT
5 Claims, 2 Drawing Figs.

[52] U.S. Cl. ....179/175.21, 179/175.2
[51] Int. Cl. .... H04m 3/24
[50] Field of Search ....179/175.21, 175.2, 175.2 C

[56] References Cited
UNITED STATES PATENTS
2,732,442 1/1956 Murray .... 179/175.21

*Primary Examiner*—Kathleen H. Claffy
*Assistant Examiner*—Douglas W. Olms
*Attorneys*—Cyril A. Krenzer, K. Mullerheim and B. E. Franz

ABSTRACT: A telephone switching system of the step-by-step type includes a trap circuit to lock up the switches involved in a double connection. The circuit includes: line current detectors, a supervisory lead status detector, a timer and a lockup switch. The timer is effective to cause operation of the lockup switch to hold the circuits involved when the supervisory lead status detector discovers a busy indication lasting a predetermined time after the line current ceases to flow.

INVENTOR
TRIFON P. TRIPSAS
BY Bernard E. Franz
ATTORNEY

COMMUNICATIONS SYSTEM, DOUBLE CONNECTION TRAP CIRCUIT

BACKGROUND OF THE INVENTION

1. Field of the Invention

This invention relates in general to step-by-step type telephone switching systems and more particularly to a circuit for "trapping" the switches faultily involved in a double connection.

2. Description of the Prior Art

Known systems of step-by-step switching exchanges of the Strowger type commonly utilize a switch train including a linefinder and a selector. The linefinder as its name implies responds to a call for service from a line circuit and proceeds to search for the terminal of this line in its associated bank or array of terminals. It is not a pulse controlled switch, but self-interruptedly steps until its wipers or contact arms arrive at the marked terminal. The subscriber line is then connected to a particular selector with which the finder is associated. The selector is the first pulse controlled switch, and responds to the subscriber dialed digits to extend the line conductors to the numerical group of contacts corresponding to the first dialed digit. Subsequent switches further extend the connection until the desired terminal and subscriber station are reached. A detailed description of exchange equipment of the step-by-step may be found in *Automatic Telephone Practice* by Harry E. Hershey, the seventh edition published in 1954 by Technical Publications of Whitewater, Kansas. Special reference is made to pages 110 to 121 where a description of the linefinder circuit is found and pages 184 to 187 where a description of the selector circuit is found. This reference material is hereby incorporated as if fully disclosed herein.

The first selector and any following selectors in the switch train upon reaching the desired group or level corresponding to the dialed digit, proceed to hunt or test each of the contacts of the group to find an idle one. During this process it is possible for the selector switch to test a contact and find it idle, but due to a malfunction step forward to a used or busy contact. This results in the calling subscriber's line being double connected on to an existing connection. Where these faults of double connecting have been treated as minor annoyances in the past, they have become a serious problem with the introduction of register-senders into the existing step-by-step exchanges. Since the volume of traffic is constantly increasing and greater efficiency is required of the equipment, a double connection which causes excessive amounts of equipment to be used is more troublesome than it was formerly.

In the past, the only way the service personnel had to test a switch that faultily performed in this manner was to test each of the switches by simulating the conditions during a routining test call procedure. Obviously this was a time-consuming operation and if the switch was erratic it might not even be found. This proved to be a frustrating and expensive experience in the face of subscriber complaints regarding double connections.

Accordingly, it is an object of the present invention to provide a circuit arrangement capable of detecting the occurrence of a double connection in a particular switch train.

SUMMARY OF THE INVENTION

According to this invention, when a station in the process of placing a call connects to an established connection, its switch train locks to ground via the supervisory lead. This ground is present even when the station goes on hook in an attempt to disconnect therefrom. When the station hangs up, an open circuit of its line for more than about 3 seconds and a ground potential on the supervisory lead causes the circuit to function to supply an additional locking ground and alarm signal.

BRIEF DESCRIPTION OF THE DRAWING

The novel features which it is believed are characteristic of the invention, both as to its organization and method of operation will be more apparent from the following detailed description taken in conjunction with the accompanying drawing comprising FIGS. 1 and 2 wherein.

DESCRIPTION OF THE PREFERRED EMBODIMENT

Figures 1, 2:
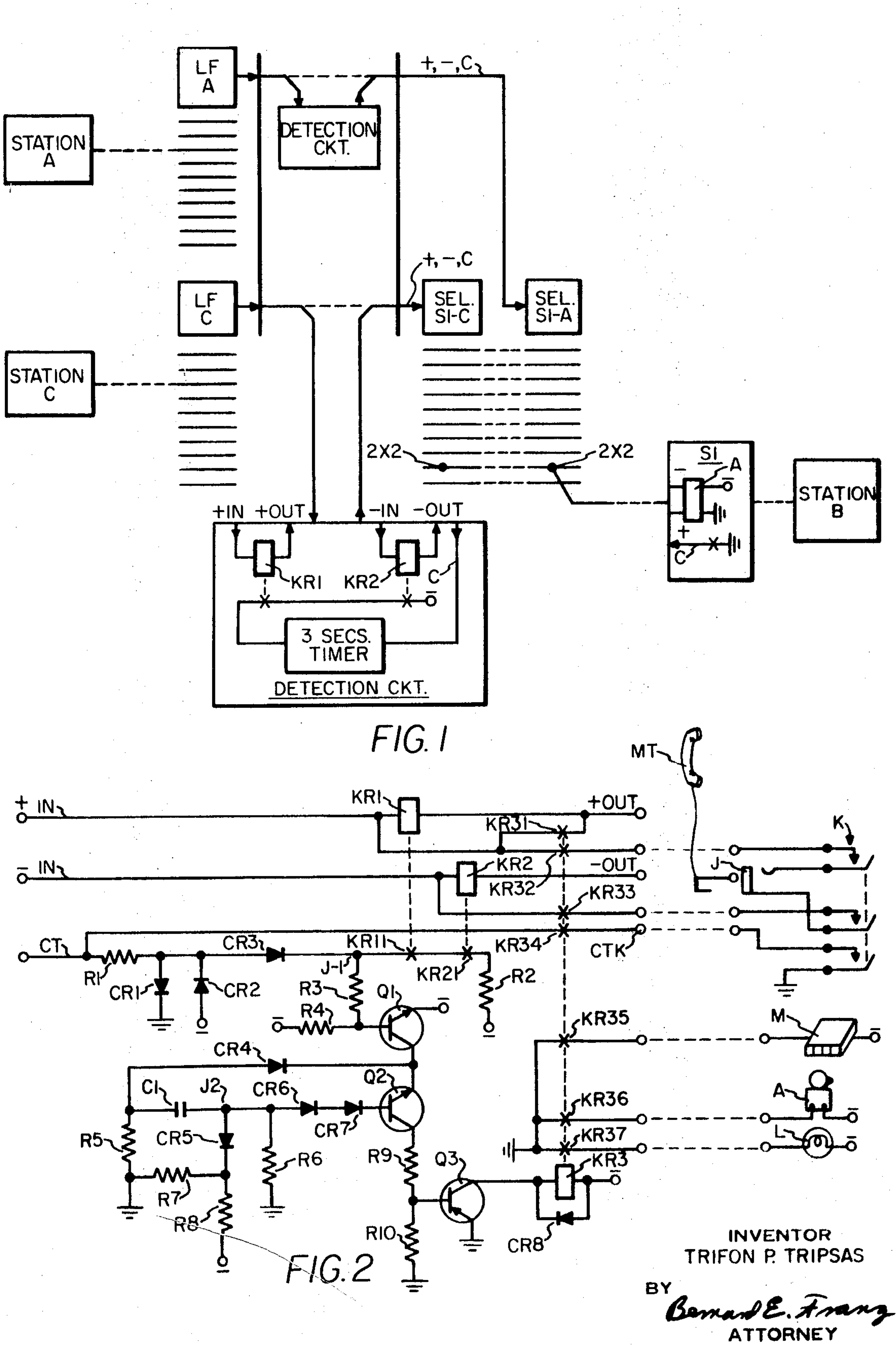
FIG. 1 shows a portion of the switches in an exchange that are involved in a double connection.
FIG. 2 shows the details of the double connection trap circuit.

As shown in FIG. 1, a calling subscriber station A is connected via a telephone line to a linefinder LF–A, selector S1–A and succeeding switches S1 to a called subscriber station B. A third subscriber station C is also shown. This subscriber station C is shown connected via a linefinder LF–C and a selector S1–C to the same selector bank terminal as is selector S1–A. This type of connection known as a double connection occurs when the second selector oversteps an available terminal, or for some other cause, fails to respond to the busy marking on a used terminal set. This is obviously an undesirable operation and one that presents a difficult problem for correction, since the offending switch is one of a very large number of similar switches and further it may be inconsistent in its malfunctioning.

To overcome this problem of locating such a defective switch, the circuit of FIG. 2, shown connected into the switch train of FIG. 1 between the linefinder and the selector, has been developed.

This circuit consists of two line current monitor relays KR–1 and KR–2, a supervisory lead monitor gate transistor Q1, a time delay circuit including transistor Q2 and capacitor C1, and an amplifier transistor Q3 to operate the alarm relay KR3. When this circuit is in use the leads +IN and –IN are connected to the linefinder + and – line leads respectively. The leads designated +OUT and –OUT are connected to the selector input line + and – leads respectively, while the CT lead of this circuit is connected to the supervisory lead C between the selector and linefinder switches. Connected in this manner the line current monitor relays KR1 and KR2 are in series with the calling subscriber's line, and during the progress of a call are operated by the line current flowing therethrough. The operation of relays KR–1 and KR–2 closes contacts KR11 and KR21 to connect negative battery via resistor R2 to the junction J–1 between the cathode of diode CR–3 and the resistor R3. The positive "C" lead potential at terminal CT is extended via resistor R1 and diode CR–3 and resistor R3 to the base of transistor Q1. Resistor R4 connected between a negative source and the base of Q1 along with resistors R1, R2 and R3 form the base biasing network for transistor Q1, to maintain it in a nonconducting state until the positive potential on lead "CT" causes transistor Q1 to become conductive after the removal of the negative potential via resistor R2. This will happen when a subscriber in the process of placing a call connects with an existing connection and hangs up. Thus relays KR1 and KR2 restore and remove the negative potential via resistor R2 at their contacts KR11 and KR21. The switch train however locks up to ground via lead C. This ground is present even when the station goes on hook in an attempt to disconnect. This ground on the supervisory lead C is normally under the control of the calling subscriber and is removed when he hangs up to release his switch train to the called subscriber. However, when the calling subscriber switch, through some fault, connects with an existing connection the supervisory leads of the two calling subscribers are commoned, and the second subscriber's switch train cannot release, until the initial calling subscriber hangs up, because of the ground potential from the initial calling subscriber's switch train. While on hook, the current on its loop is interrupted. When the interruption lasts more than 3 seconds, the ground on the "C" lead is detected to cause the circuit to function and to indicate the condition. When the line current is interrupted the line monitor relays KR1 and KR2 restore to open contacts KR11 and KR21. Thus, under normal conditions, this trap circuit performs no function.

However, should the calling subscriber encounter a double connection and hang up his receiver, the negative potential via resistor R2 is removed as described above and transistor Q1 becomes conductive, extending approximately 46 volts of the exchange battery across capacitor C1 via diode CR4. Capacitor C1, while in the circuit's idle state is charged to approximately 46 volts from positive potential via resistor R5 to one plate of C1 and negative potential via resistor R8 and the cathode to anode circuit of diode CR5 to the other plate of capacitor C1. Thus at the moment that transistor Q1 becomes conductive the negative side of the capacitor at the junction of diodes CR5 and CR6 develops approximately 96 volts negative with respect to ground, reverse biasing diodes CR5, CR6, and CR7. After approximately 3 seconds capacitor C1 is discharged via resistor R6 to a potential lower than the negative battery voltage. The exact value to which the negative plate of C1 at junction J2 will drop to will be determined by the voltage drop across diodes CR6 and CR7, the base-emitter voltage drop of transistor Q2 and the collector to emitter voltage drop of transistor Q1. This base-emitter current flow in transistor Q2 biases it into the conductive state, thus applying a negative potential to the terminal of the series resistor network of R9 and R10, for biasing transistor Q3. With the base of transistor Q3 connected to the junction of resistors R9 and R10, the application of the negative potential causes Q3 to become conductive, thus completing the operate circuit for relay KR3. Relay KR3 operates and shunts relay KR1 at contacts KR31 to prevent the timer circuit from restoring in the event of current reappearing in the line loop circuit, and extends a ground potential to such auxiliary equipment as may be desired by the operating personnel, for example, a meter M to record the frequency of such occurrences at contacts KR35, a buzzer A and a lamp L to alert the personnel of the occurrence of such condition at contacts KR36 and KR37 respectively.

Should the operating personnel desire to trace the condition after its occurrence, they have merely to connect a ground potential to terminal CTK, by the operation of a Key K whereby relay KR3 upon operating extends this potential via contacts KR34 to the "C" supervisory lead of the switch train to maintain it in its operated state. Contacts are also provided for extending the + and − line leads via relay KR3, contacts KR32 and KR33 to this same key to permit the operating personnel to monitor the line by means of a test telephone MT.

In one specific embodiment of FIG. 2 the following component values have been utilized to achieve very satisfactory operation; however, it will be appreciated that these values are given by way of example.

| | |
|---|---|
| R1 | 20KΩ |
| R2 | 100Ω |
| R3 | 10KΩ |
| R4 | 1.5KΩ |
| R5 | 22K |
| R6 | 100K |
| R7 | 150K |
| R8 | 16K |
| C1 | 40 μf. 60v. |
| CR1–CR8 | 1N645 |
| Q1, Q2 | 2N1613 |
| Q3 | 2N1132 |
| KR1, KR2 | Automatic Electric Co. Type KR-20017-11A |
| KR3 | Automatic Electric Co. Type D-555177-AN1. |

What is claimed is:

1. A trap circuit associated with a communication switching system having successive ranks of switch means interconnected by interstage links, including at least a pair of line conductors and a supervisory conductor, for completing communications connections: said trap circuit comprising:
   a busy test circuit connected to said supervisory conductor of said interstage link operated upon detecting a busy indicating potential thereon,
   an alarm signal means,
   a timing means connected to said busy test circuit and to said alarm signal means and operated thereby in response to finding a busy potential to extend an operating potential upon the lapse of a fixed time interval to said alarm signal means, and
   a pair of line current monitor relays connected in said interstage link, each in series with one of said line conductors and each having contact means for extending a disabling potential to said busy test circuit upon detecting a current flow in said line conductors,
   whereby said alarm means is only operative upon detecting a busy condition of said link without an associated line current flow, thus indicating a faulty operation of the switches associated with said link.

2. A trap circuit as claimed in claim 1 wherein said busy test circuit includes a transistor and a resistive voltage dividing network connected across a voltage source and to said transistor to maintain said transistor in a normally nonconductive state and biased by a busy indication on said supervisory conductor into a conductive state.

3. A trap circuit as claimed in claim 1 wherein said timing means includes a resistive voltage dividing network connected across a voltage source with a capacitor normally maintained in a first changed state connected across a portion of said resistive network and a transistor connected to said resistive dividing network and maintained nonconductive thereby until after an interval of time determined by the time required to charge said capacitor to a second charged state after operation of said busy test circuit.

4. A trap circuit as claimed in claim 1 wherein said alarm signal means includes a transistor having
   base, emitter and collector electrodes with said emitter connected to a first potential and said base electrode connected to said timing circuit,
   a relay connected between a second potential and said collector electrode, whereby operation of said timing circuit places said transistor in a conductive state to operate said relay.

5. A trap circuit as claimed in claim 4 wherein said relay includes contacts to extend operating potentials to audio and visual signal means.